United States Patent
Marr et al.

(10) Patent No.: US 9,910,471 B1
(45) Date of Patent: *Mar. 6, 2018

(54) RECONFIGURABLE ARRAY OF BACKUP BATTERY UNITS

(71) Applicant: Amazon Technologies, Inc., Reno, NV (US)

(72) Inventors: Michael David Marr, Monroe, WA (US); Peter George Ross, Olympia, WA (US); David Edward Bryan, Seattle, WA (US); Samuel J. McKelvie, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/865,090

(22) Filed: Apr. 17, 2013

(51) Int. Cl.
*G06F 1/30* (2006.01)
*G06F 1/32* (2006.01)

(52) U.S. Cl.
CPC . *G06F 1/30* (2013.01); *G06F 1/32* (2013.01)

(58) Field of Classification Search
CPC ................ G06F 1/32; G06F 1/26; G06F 1/28
USPC ....... 713/300, 310, 320, 321, 322, 323, 324, 713/330, 340, 375
See application file for complete search history.

(56) References Cited

U.S. PATENT DOCUMENTS

| | | | | |
|---|---|---|---|---|
| 5,235,232 A | * | 8/1993 | Conley | G21H 1/12 136/253 |
| 6,034,506 A | | 3/2000 | Hall et al. | |
| 7,058,480 B1 | * | 6/2006 | Kawanishi | G06F 1/3203 700/286 |
| 9,098,278 B1 | * | 8/2015 | Nay | G06F 1/3212 |
| 9,116,692 B1 | * | 8/2015 | Krein | G06F 1/3203 |
| 2005/0023054 A1 | * | 2/2005 | Weidenheimer | F41B 6/00 180/65.25 |
| 2005/0086543 A1 | | 4/2005 | Manuell et al. | |
| 2005/0188075 A1 | | 8/2005 | Dias et al. | |
| 2008/0178029 A1 | | 7/2008 | McGrane et al. | |
| 2009/0085553 A1 | | 4/2009 | Kumar et al. | |
| 2009/0125737 A1 | | 5/2009 | Brey et al. | |

(Continued)

OTHER PUBLICATIONS

Marosek, Mark W., "60V/3A Step-Down DC/DC Converter Maintains High Efficiency over a Wide Range of Input Voltages," Linear Technology [online], Aug. 2002 [retrieved on Mar. 13, 2013]. Retrieved from the Internet:< URL: http://cds.linear.com/docs/en/lt-journal/60V_3A_LT3430_Aug02_Mag.pdf>.

(Continued)

*Primary Examiner* — Jaweed A Abbaszadeh
*Assistant Examiner* — Keshab Pandey
(74) *Attorney, Agent, or Firm* — Kilpatrick Townsend & Stockton LLP

(57) ABSTRACT

An array of backup battery units that can be reconfigured to provide different currents and/or voltages depending upon load conditions. The backup battery units are attached to a bus and can be reconfigured, for example, between a configuration in which the battery backup units are wired in series to a configuration where the battery backup units are wired in parallel. Additional embodiments are directed to an array of backup battery units that can isolate a single battery backup unit so that the battery backup unit can be removed from the bus while the bus is under load. The removed battery backup unit can then be tested, maintained, and/or replaced.

25 Claims, 14 Drawing Sheets

(56) References Cited

U.S. PATENT DOCUMENTS

| | | | |
|---|---|---|---|
| 2009/0180579 A1* | 7/2009 | Ellis | H04N 21/4436 375/345 |
| 2009/0261783 A1* | 10/2009 | Gonzales | G06F 1/26 320/121 |
| 2009/0281679 A1 | 11/2009 | Taft et al. | |
| 2009/0286149 A1* | 11/2009 | Ci | H01M 10/44 429/160 |
| 2010/0013323 A1* | 1/2010 | Chung et al. | 307/125 |
| 2010/0064151 A1 | 3/2010 | Saeki et al. | |
| 2010/0123440 A1 | 5/2010 | Bandholz et al. | |
| 2011/0101787 A1* | 5/2011 | Gaul | H01L 31/02021 307/85 |
| 2011/0213434 A1* | 9/2011 | Signoff et al. | 607/8 |
| 2011/0296225 A1 | 12/2011 | Belady et al. | |
| 2012/0072745 A1 | 3/2012 | Ahluwalia et al. | |
| 2012/0178496 A1 | 7/2012 | Hwang et al. | |
| 2012/0324245 A1 | 12/2012 | Sinha et al. | |
| 2013/0185717 A1 | 7/2013 | Lakshminarayanan | |

OTHER PUBLICATIONS

Schlecht, Dr. Martin F., "A Two-Stage Approach to Highly Efficient, Super-Wide Input Voltage Range DC-DC Converters," SynQor [online], No Date Given [retrieved on Mar. 13, 2013]. Retrieved from the Internet:< URL: http://www.synqor.com/documents/whitepapers/wp_two-stage_approach.pdf>.

Vibrick. 38V Input DC-DC Converter Modules. Datasheet [online]. Vicor Corporation, No Date Given [retrieved on Mar. 13, 2013]. Retrieved from the Internet: <URL:http://cdn.vicorpower.com/documents/datasheets/vibrick/ds_IB050E120T32N1-00.pdf>.

* cited by examiner

RECONFIGURABLE ARRAY OF BACKUP BATTERY UNITS

BACKGROUND

A datacenter is a facility used to house a collection of computer servers and associated components, typically network hardware. The collection of computer servers is often called a "server cluster" or "server farm," and is designed to accomplish server needs far beyond the capability of a single machine. The networking hardware typically includes network switches and/or routers which enable communication between the different parts of the server farm and the users of the server farm.

Server farms are commonly used for cluster computing, web services, remote data storage, web hosting, and other web services. Server farms are increasingly being used by enterprises instead of, or in addition to, mainframe computers. As a result, it is a common expectation that a datacenter's computer resources be available, even in times of catastrophic events.

BRIEF DESCRIPTION OF THE DRAWINGS

Various embodiments in accordance with the present disclosure will be described with reference to the drawings, in which.

DETAILED DESCRIPTION

Figure 1:
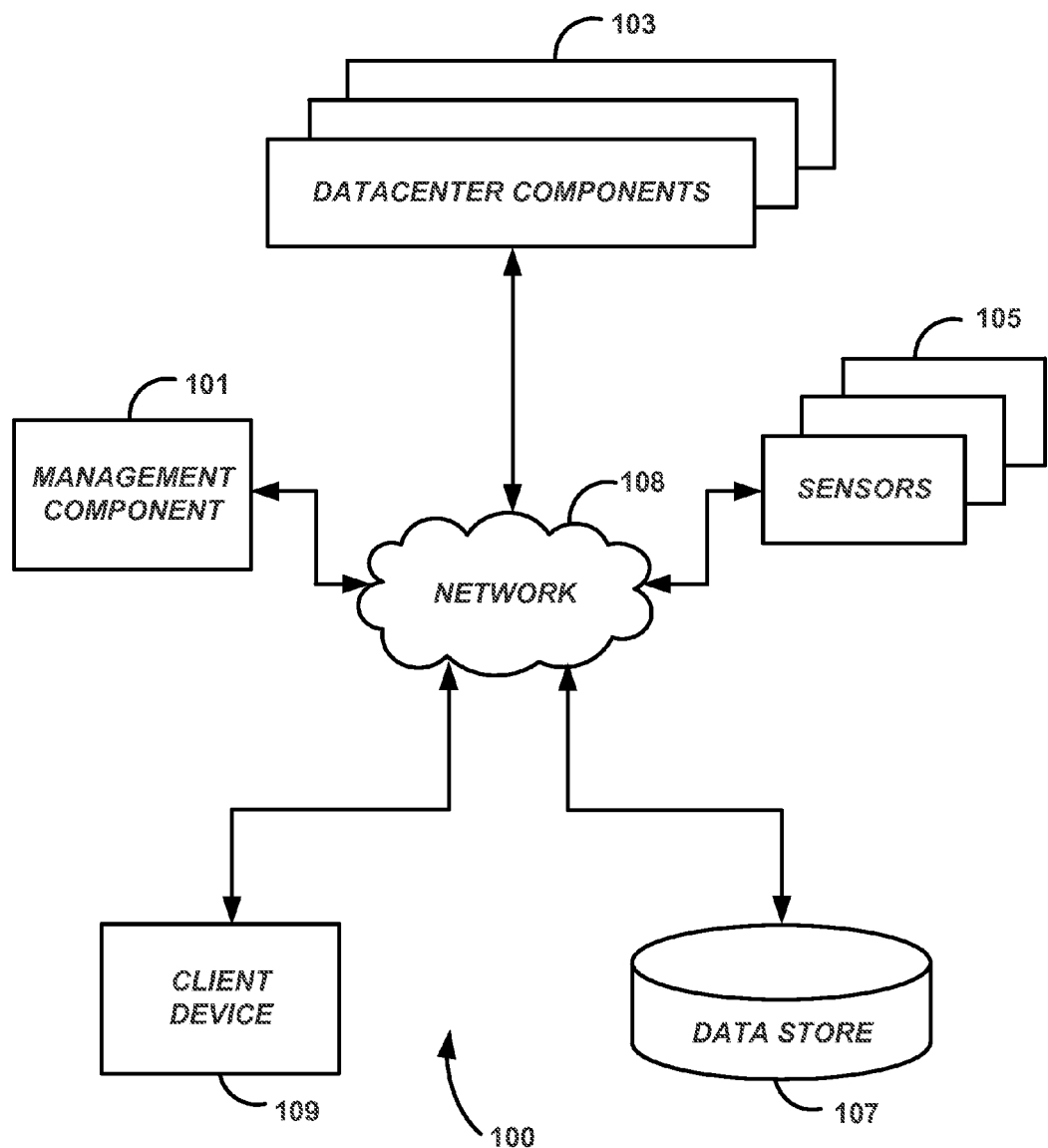
FIG. 1 is a block diagram of an illustrative datacenter environment including a management component in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Generally described, the present disclosure relates to the management of computing device resources, such as datacenter components in a datacenter. More specifically, embodiments herein are directed to allocating and/or reconfiguring battery resources in accordance with an event. Embodiments herein are directed to configuring battery backup units (BBUs) differently in certain situations, such as catastrophic events, typically based upon the needs of critical datacenter components to the system. Additional embodiments are directed to reconfiguring an array of BBUs based upon needs of critical datacenter components.

As an example, datacenter components (e.g., services or devices) can be assigned a criticality level representing a layer, such as 1, 2, 3 and so forth. The battery resources serving different layers can be treated differently in a case of an event, such as being reconfigured to provide more voltage and less current, or vice-versa. Also, battery resources can be allocated to a more important layer or layers, and less important layers can be gracefully shut down and/or slowed down. As an example, in a power outage, layer 1 and 2 computing device resources may be allocated battery resources and remain active, whereas layer 3 and lower layers can be provided short term battery resources and shut down or slowed down. If needed, the battery resources, once allocated, can be reconfigured to provide more current or voltage.

In addition, in embodiments, battery resources can be allocated, in the case of an event, to the more critical datacenter components in the case of an event. As an example, if a datacenter goes for long without power, battery resources can be taken away from some less critical datacenter components and redirected to the most critical layers of datacenter components.

Embodiments herein can be used in any environment utilizing multiple components, but for ease of description, a datacenter is described. Embodiments herein are directed primarily to management of battery resources that provide emergency or backup power to hardware components that are connected together by a network.

In accordance with still further embodiments, a BBU includes a circuit that can be reconfigured from one operation (e.g., cells wired in series) to another operation (e.g., cells wired in parallel) so as to address a particular power need for datacenter components. For example, the BBU can be changed to series operation to provide prolonged power for a single datacenter component, or can be switched to parallel operation to operate more efficiently on DC to DC conversion.

Additional embodiments are directed to a robust BBU that can be reconfigured to test, service, or replace a cell in the BBU. The robust BBU can, in embodiments, change between series and parallel operations to power datacenter components, despite one or more cells being disconnected from the BBU's circuit.

An example datacenter environment or datacenter 100 is shown in FIG. 1. The datacenter 100 includes a management component 101, multiple datacenter components 103, sensors 105, a data store 107 and a client device 109. The various components may communicate via a network 108. In some embodiments, the datacenter 100 may include additional or fewer components than those illustrated in FIG. 1. For example, the number of datacenter components 103 may vary substantially; there may be no sensors 105 and so forth. Typically, components of the datacenter 100 are located in a single building or connected buildings, but one of more of the components, such as the management component 101 and/or the client device 109, can be located remote of the datacenter building complex and can be accessed remotely via the network 108.

The management component 101 can receive data from a number of sources, correct errors and reconcile data from one source to that of another, maintain and/or retrieve layer information about components in the system, generate instructions on handling of battery resources, and respond to queries from the client device 109. For example, the management component 101 may receive data regarding the datacenter components 103 and operational characteristics of the datacenter components directly from the datacenter components, from the sensors 103, from the data store 107, from data entry (e.g., via the client device 109), or from some other source. As described below, the data may indicate the location, power system connectivity or status, battery condition or status, or other relative information about the datacenter and the various datacenter components 103. The management component 101 can reconcile the data received from the disparate sources (e.g., power information data from a sensor integrated with a datacenter component 103 against data from an independent sensor 105 nearby), and generate instructions for handling the datacenter components 103 and battery resources for the datacenter 100. In some embodiments, the management component 101 can generate an alert to request human interaction with the device, for example in accordance with a playbook. In other embodiments, the management component 101 can generate instructions that are received by the datacenter component 103, such as battery resources, to cause the datacenter component to react accordingly, e.g., to change state and/or operation.

The management component 101 and/or the client device 109 can be computing devices, such as server computers or desktop computers, configured with various hardware and software modules to implement the processes described herein. In addition, the management component 101 and/or the client device 109 can be physically located within a datacenter, and thus may also be datacenter components 103. In some embodiments, the management component 101 or the client device 109 may be remote from the datacenter. If desired, the management component can be integrated with the client device 109 or physically co-located on the same computing device.

A user, such as a datacenter administrator or technician, can use the client device 109 to assign layers to datacenter components 103 and assign criticality to the layers that are managed by the management component 101. Layer and/or criticality information can also be automatically associated with particular datacenter components 103. For example, network hardware can always be assigned the highest level of criticality. The client device 109 can also be used to establish rules for handling battery resources upon an event and/or to change battery resources upon command. The management component 101 can store this information, for example in the data store 107 and, upon receiving information about an event, such as a power outage, can handle or otherwise instruct the datacenter components 103 to be handled in accordance with their layer criticality.

Figure 2:
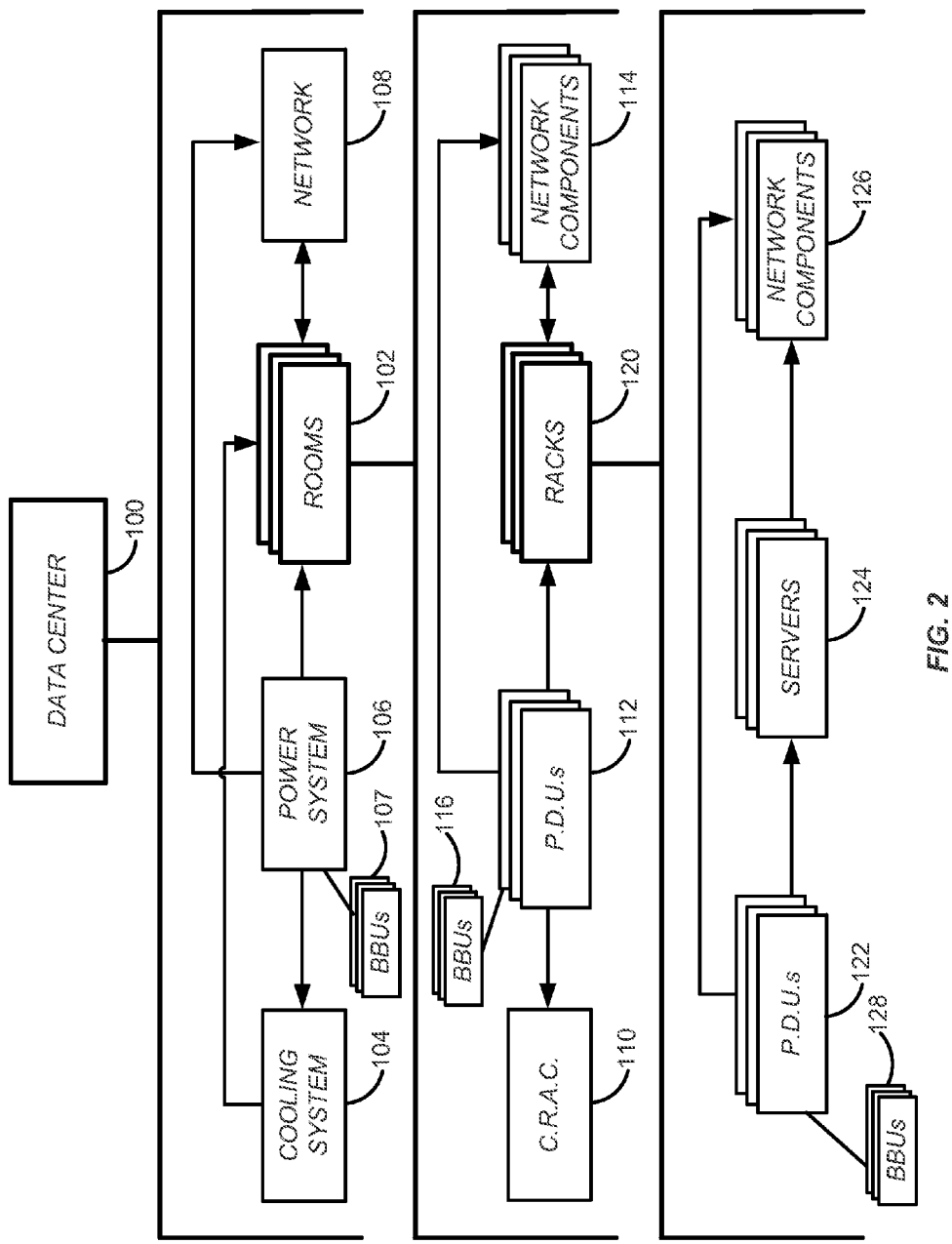
FIG. 2 is a block diagram of an illustrative datacenter hierarchy including datacenter components in accordance with embodiments.

FIG. 2 illustrates an example of datacenter components 103 that can be monitored and managed by the management component 101 of FIG. 1, or some other component. The various datacenter components 103 may be included in implementation of the datacenter 100 to provide computing capacity, storage and other services to any number of customers or internal users. In some embodiments the datacenter 100 may have more or fewer components than are illustrated in FIG. 2.

A datacenter 100 may be part of a larger computing system operated by a network computing provider that includes several datacenters 100 across any number of geographical areas. The various datacenters 100 may communicate via a network, which can be the network 108 or another network. The network may be a wide area network (WAN), a collection of networks operated by distinct entities, such as the Internet, or some other network. A network computing provider can provide computing and storage capacity to a single operator, such as a single enterprise, such as a company or university. The computing services may include web hosting, data backup and mirroring, disaster prevention co-locations and the like. In another embodiment, the network computing provider provides such computing services and storage capacity to a variety of independent customers, such as a number of different business entities. In yet another embodiment, the network computing provider can provide computing services and storage capacity to users in the general public.

Customers may access the services on-demand or on a subscription basis. In some embodiments, the customers of the network computing provider may specify or select a particular computing device hardware and software configuration to use. Customers may then connect to a different physical computing device which satisfies the chosen hardware configuration each time the customer initiates a computing session. Virtual machine images of the chosen software configuration may be dynamically loaded or instantiated on a computing device as part of a computing session initialization process. In some embodiments, the software may not be a virtual machine image, and the computing device need not be a different computing device for each computing session.

FIG. 2 is a block representation of a hierarchy of the datacenter 100 in accordance with embodiments. Broadly described, as shown by the hierarchy in the drawing, the datacenter 100 includes rooms 102, which in turn include racks 120. The racks 120 include servers 124 and/or network components 126. A room 102 of the datacenter 100 illustrated in FIG. 2 can encapsulate a number of datacenter components 103 and further hierarchical levels.

As illustrated in FIG. 2, a datacenter 100 may include any number of rooms 102 in which computing devices and other datacenter components 103 that provide the services described above, or which support components which provide the services, are physically located. The datacenter 100 may also include a cooling system 104, a power system 106 and a network 108. For example, a datacenter 100 typically has a power system 106 that connects to a power source, such as the local power grid. The power system 106 may include a power generator for backup or as a primary power source. The power system 106 provides power to the various datacenter components 103, including the cooling system 104, the network 108 and also the rooms 102.

The various components 103 of the datacenter 100 may emit heat that can be harmful to the function of the components themselves and to other components nearby. Therefore, the datacenter 100 may include the cooling system 104, such as an air conditioner, that regulates the temperate of the datacenter 100 and its various rooms 102 and components. In some embodiments, a more powerful or more efficient cooling system 104 may be provided instead of, or in addition to, an air conditioner. For example, some datacenters 100 may include a cooling loop that circulates chilled water throughout the datacenter 100 and various rooms 102 thereof, and a condenser or evaporative waterfall to cool the water after it has absorbed heat from the datacenter 100 components.

The datacenter components 103 associated with the datacenter 100 can also communicate with each other and with components outside of the datacenter 100 via the network 108. The network 108 can be provided by a number of components, such as routers, switches, hubs and the like. The network 108 components may communicate via cables or wirelessly. The network 108 can provide connectivity between the various rooms 102 of the datacenter 100 and to one or more network links outside of the datacenter 100, for example to the Internet or a WAN. In some embodiments, there may be several core switches and/or routers with which the network components of the various rooms 102 communicate to provide redundancy and fault tolerance.

A room 102 may include any number of racks 120 of computing devices, a cooling system 104 component such as a computer room air conditioning (CRAC) unit 110, any number of power system 112 components such as power distribution units (PDUs) 112, and any number of network components 114 in communication with the network 108 of the datacenter 100.

The PDUs 112 may include one or more rack-level PDUs 122 which each serve power to one or more racks 120. In such cases the room-level PDUs 112 may connect to rack-level PDUs 122 via cables and power whips. The rack-level PDUs 122 can then distribute power to the devices of the rack 120 as described below. In addition, the room-level PDUs 112 can provide power to the CRAC unit 110 and the network components 114.

The network components 114 include room-level switches and/or routers which facilitate communication between the computing devices housed in the racks 120, described below, and the network 108 of the datacenter 100. For example, a room-level switch 114 may facilitate communication between computing devices on separate 120 racks within the same room. Additionally, the room-level switch 114 may, in combination with the core routers of the datacenter 100, facilitate communication between computing devices in different rooms 102, or even different datacenters 100 and other computing devices outside the network computing provider environment.

A rack 120 may be any frame or enclosure capable of mounting one or more servers or other computing devices. For example, the rack 120 can be a four-post server rack, a server cabinet, an open-frame two-post rack, a portable rack, a LAN rack, combinations of the same, or the like. In some embodiments, the computing devices mounted on the rack 120 may be networking components 126, such as switches or routers, instead of or in addition to servers. For example, a datacenter room 102 may have, in addition to racks 120 which contain servers 124, one or more racks 120 which may contain any number of switches. In some embodiments, a datacenter room 102 may contain only one rack 120, or may contain zero racks 120. For example, a datacenter room 102 may have servers 124 embodied as one or more large-scale computing devices, such as mainframes or midrange computers, which may not be grouped together physically in a rack 120.

A rack 120 may also encapsulate a number of datacenter components 103 and additional hierarchical levels, such as PDUs 122, servers 124 and network components 126. For example, a rack 120 may include any number of PDUs 122 and other datacenter components 103, such as power whips and the like, for providing power from the room-level PDUs 112 to the servers 124 and network components 126 mounted in or associated with the rack 120. The network components 126 of the rack 120 can include top-of-rack (TOR) switches which provide network connectivity between the room-level network components 114 and the servers 124. The network components 126 can also be powered by the rack-level PDUs 122.

Each server 124 can comprise additional datacenter components 103, each of which may be monitored, such as a processing unit, a network interface, computer readable medium drive and a memory. The memory generally includes RAM, ROM and/or other persistent or non-transitory memory, and may contain a hypervisor for managing the operation and lifetime of one or more virtual machine (VM) instances. In some embodiments, the VM instances are also datacenter components 103 which can be assigned a layer and can be managed by the management component 101 of FIG. 1. In other embodiments, application software or services operating on other datacenter components 103 can also be considered datacenter components that can be assigned layers and be managed by the management component 101. Thus, the management component 101 can manage devices and/or software, including software services such as VMs, in accordance with the processes described herein.

As described above, servers 124 can be configured to host VMs at the request of customers of the network computing provider operating the datacenter 100. For example, a business entity may rent computing and storage capacity from the network computing provider, and may choose a VM configuration or have a VM machine image customized for their needs. A single server 124 may at any time have one, two, or (possibly many) more VMs operating on behalf of customers, actively processing data, responding the customer requests and the like. In some embodiments, the server 124 need not host VMs, and therefore the server 124 may not have a hypervisor or VMs in memory.

In operation, a customer may initiate processing on a server of the datacenter 100 by transmitting network communications via the Internet to the datacenter 100. The communications can be routed through the network 108 of the datacenter 100, passing through a core switch and to a room-level network component 114, such as a switch, of a particular room 102. From there, the communications are passed to a rack 120, where they pass through a rack-level network component 126, such as a TOR switch, before ultimately arriving at a server 124. The server 124 may be a fixed host which performs internal processing, such as routing the communication to another server 124 where a VM for the customer will be launched to process the communication and provide the customer computing session. As will be appreciated, such an operation can involve additional communications sent over multiple rack-level network components 126, room-level network components 114, and components of the network 108 of the datacenter 100 before arriving at a server 124 that will launch a VM for the customer in a different room 102 of the datacenter 100.

The server 124 which launches the VM for the customer may receive power, through a power cable, from a rack-level PDU 122 of the rack 120 on which the server 124 is located. The rack-level PDU 122 may in turn receive power through one or more "power whips" or cables from a room-level PDU 112. The power may pass through any number of PDUs in between the rack-level PDU 122 and room-level PDU 112. The room-level PDU 112 can draw power from the power system 106 of the datacenter 100. The power may come from another PDU or directly from an on-site generator or power source, or from a link to the local power grid outside of the datacenter 100.

One or more battery resources, such as battery backup units (BBUs) 116, 128 can be provided for use in a power failure or other backup purposes. A room-level BBU 116 can be dedicated to one or more racks 120 of datacenter components 103, or a rack-level BBU 128 can be dedicated to one or more datacenter components (e.g., connected to or associated with the PDU 122), which can be located on one or more racks. In addition or as an alternative, one or more BBUs 107 can be provided that provide backup power resources for datacenter components distributed through the datacenter 100.

Figure 3:
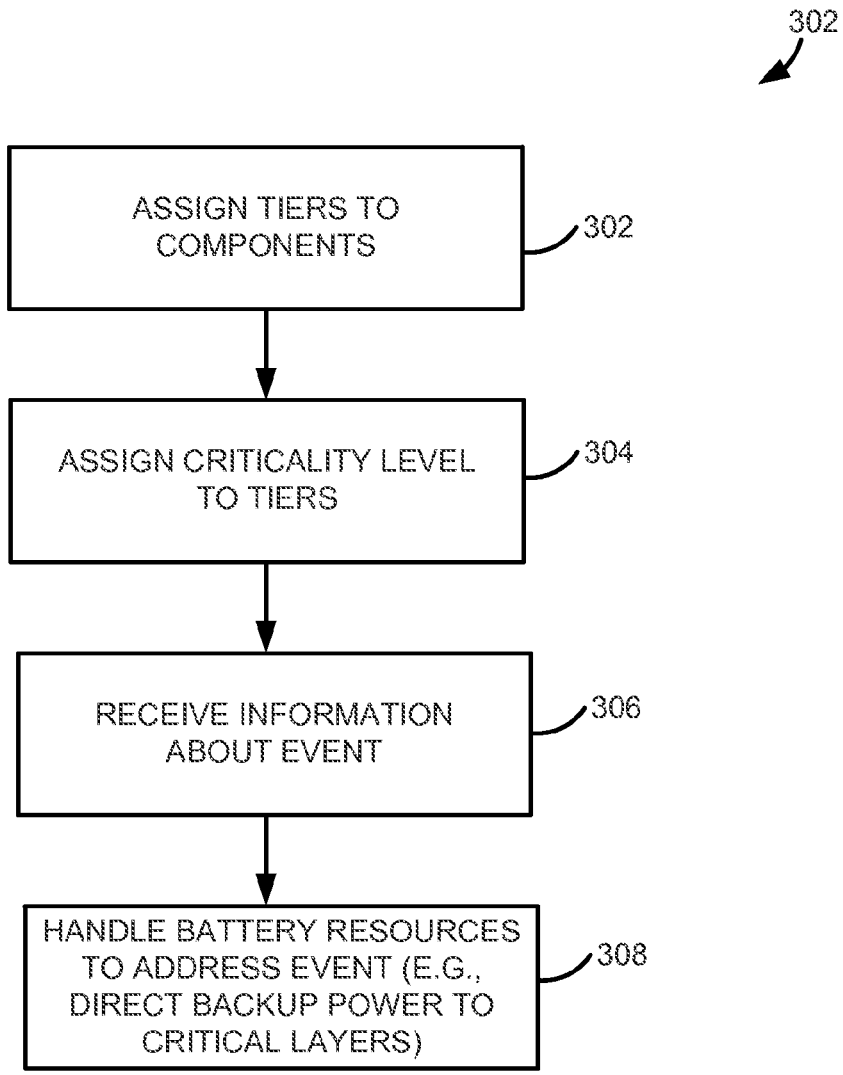
FIG. 3 is a flowchart showing a process for handling battery resources in accordance with embodiments.

FIG. 3 is a flowing representing a process 300 for handling battery resources, such as the BBUs 116, in accordance with embodiments. Some or all of the process 300 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 302, layers are assigned to datacenter components 103. These layers can be based, for example, upon the criticality of the devices or services of the datacenter components 103, and may be input by a user at the client device 109 (e.g., via a user interface or other selection or entry option) or may be automatically generated by the management component 101 based upon what the datacenter component is, for example automatically assigning a highest layer to a network component 114 or 126. In embodiments, the more critical datacenter component 103 is, the more important the layer that is assigned to the device or service. Alternatively or additionally, a client can purchase services from the datacenter 100 and pay extra to have its datacenter components (e.g., a VM) be handled with higher criticality. Criticality and/or layers can be established as desired by an administrator of the datacenter 100.

In the following examples, the highest order (i.e., most critical) of datacenter components 103 are designated by the numeral "1" with increasing numbers representing less critical services. However, any designation can be used to represent criticality of a device or service.

Figure 4:
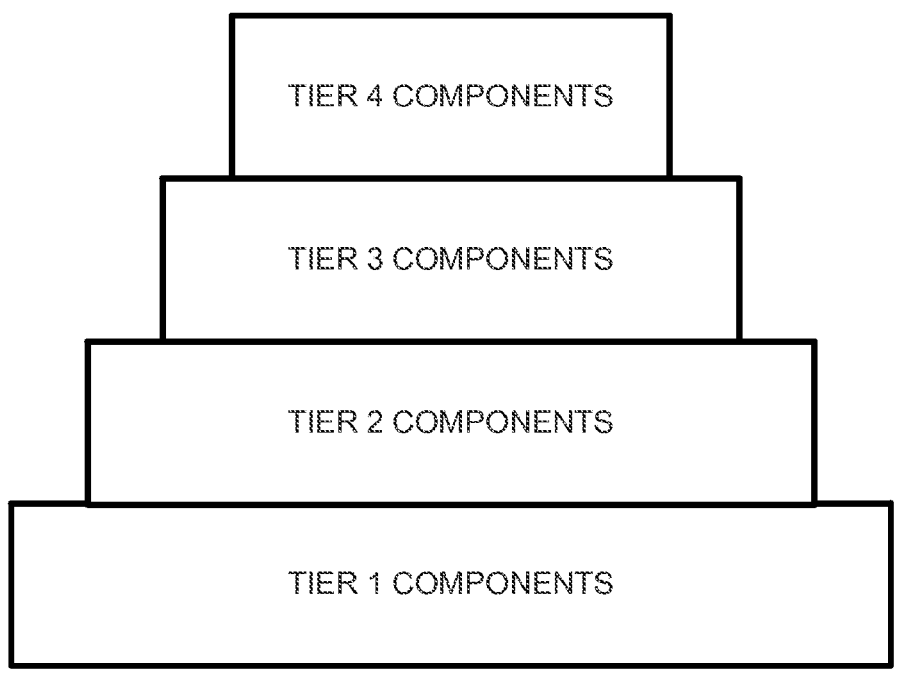
FIG. 4 is a block diagram representing a hierarchy of layers of datacenter components in accordance with embodiments.

As an example, FIG. 4 shows a hierarchy of layers for datacenter components 103 in accordance with embodiments. In these embodiments, layer 1 datacenter components 103 in the datacenter 100 are those datacenter components 103 defined to be most critical to operation of the datacenter. Examples of layer 1 datacenter components 103 can be the pre-boot execution environment (PXE), assignment of Internet protocol (IP) addresses, network components 114, and so forth. Typically, although the section representing layer 1 datacenter components is largest in the figure, there are typically fewer layer 1 datacenter components 103 than layer 2 and higher, and the sizing of the blocks in FIG. 4 represents a hierarchical structure, with layer 1 being the base and others relying on higher order (lower layer number) datacenter components 103. Thus, in general, in the embodiment shown in FIG. 4, layer 2 datacenter components 103 rely upon layer 1 datacenter components 103 for operation, and layer 3 datacenter components 103 rely on layer 2 and 1 datacenter components 103 for operation, and so forth. In addition, datacenter components 103 can be dependent upon datacenter components 103 at the same level. However, this structure is not required, and device and service criticality can be set by a user (e.g., an administrator) in accordance with a preference instead of a need for a higher order layer. Customer expenditures, such as a one-time fee or recurring charges, can be taken into account. As an example, as described above, a VM service may be set at a higher criticality based upon the price a customer is paying for the VM service. This criticality can be set by moving a datacenter component 103 to a higher layer based upon a customer expenditure, or moving a customer's service to a higher layer datacenter component 103.

As a result of the layers being assigned to the datacenter components 103 at 302, a criticality level is assigned to each of the layers at 304. This criticality level may be assigned as part of process of assigning the layers in 302, and may be designated by numbers or other information. The information regarding criticality levels is maintained for access by the management component 101, for example in the data store 107.

At 306, information is received, for example by the management component 101, about an event. The event may be, for example, a power outage, a low voltage or amperage situation, or some other event, typically, in embodiments herein, related to battery conditions, needs, or status of the BBUs in the datacenter. In general, the management component 101 manages, among possible other processes, the allocation of battery resources that are used by, or can be used by, multiple datacenter components 103. The event that the management component receives can be that the battery resources are not supplying adequate current and/or voltage, a power outage has occurred and generators are not yet in service, battery resources are close to a drained situation, a battery cell has failed, an indication that normal operation of the battery resources might not be sufficient for a particular event, and other information related to BBU status or needs. The information may come from the sensors 105, the datacenter components 103, information received from the network 108 or input at the client device 109, directly from the BBUs, or another source.

At 308, battery resources are handled in accordance with the event. As an example, the battery resources (e.g., BBUs) can be reconfigured or redirected to direct power based upon the criticality levels set in 304. As set forth above, battery resources can be allocated to datacenter components based upon criticality levels of the datacenter components and the event, for example by directing battery power to more critical layers of the datacenter components 103.

For example, as a result of a fire, part of the datacenter may be under battery power for an extended amount of time. The management component 101 can respond to this altered condition by providing information to change operation of some of the battery resources to provide support to more critical datacenter components, or providing information to reconfigure the battery resources to provide higher current or voltage, as examples. The information provided by the management component 101 can be used to automatically cause the reconfiguration, redirection, or other action, or can provide an alert for a technician or other entity to cause the action.

As an example, in the case of a power outage and where the datacenter goes on battery backup prior to going onto generators, some less critical services and/or devices can be provided more battery resources than others. The amount of time that the battery resources are altered can be varied based upon the event. These features can allow the more critical datacenter components 103 to operate, as power is directed for those resources. If another event occurs, such as a generator starting, then battery resources can be reallocated and/or reconfigured, for example to a different configuration or back to a normal configuration.

The devices and/or services that are shut down and/or that are provided battery resources or not can be specific to a particular room 102, rack 120, or datacenter component 103. A particular room 102, rack 120, or datacenter component 103 may be handled in accordance with the layers in that room, rack or datacenter component. Thus, the management component 101 may allocate battery resources in the datacenter 100 based on one or both of layer information and the event (e.g., information received from the sensors 105 or other information received regarding battery events). Allocation can also or alternatively be based on location of the datacenter components 103 in the datacenter 100.

Figure 5:
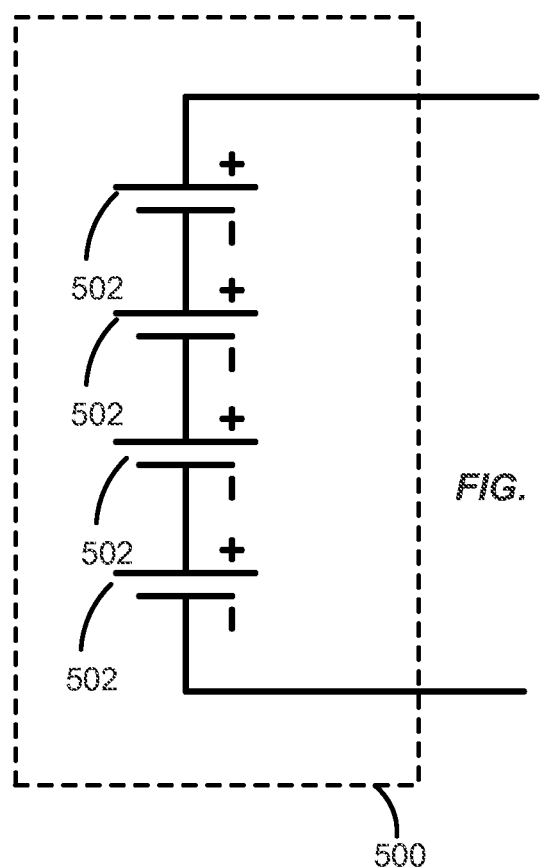
FIG. 5 is circuit diagram of a prior art backup battery unit including four battery cells wired in series.

Typically, battery backup units, such as the BBUs 116, 128, and/or 107, include a number of battery cells that are wired together in series, parallel, or a combination of these two. As an example, as shown in FIG. 5, an example of a prior art BBU 500 includes four battery cells 502 wired in series. Although four battery cells 502 are shown for the BBU 500, any number of battery cells could be used in a series circuit. For ease of reference, such a configuration is referred to as "4S" herein, representing four (4) cells wired in series (S).

In a the series circuit for the BBU 500, the current through each of the battery cells 502 is the same, and the voltage across the circuit is the sum of the voltages of the battery cells 502. Thus, a BBU that is wired in series, like the BBU 500, can provide high voltage operation, but current is limited to current flow that is possible through the battery cell 502 having the lowest current flow capacity.

Figure 6:
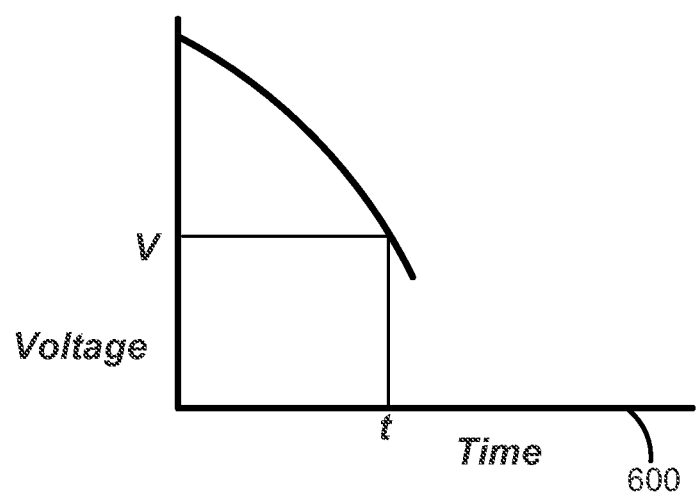
FIG. 6 is graph representing a discharge cycle of the backup battery unit of FIG. 5.

FIG. 6 shows a prior art graph 600 generally representing battery voltage discharge over time for the BBU 500 of FIG. 5. The graph shows a representation of voltage discharge for a lithium ion battery, but other batteries also discharge over time, although sometimes more rapidly. As can be seen, as voltage drops, the voltage for the BBU 500 eventually hits a voltage V at time t. The voltage V represents a voltage at which DC to DC conversion for the BBU is no longer capable because of the reduced voltage. Note also that the voltage of the BBU 500 is significantly higher than the voltage V at the start of the discharge cycle. This is due to the large voltage provided by a series circuit in a BBU. Operation of the BBU at the higher voltage can sometimes be inefficient, because the DC to DC conversion can be inefficient with a large difference between the output voltage and the conversion voltage V.

The higher voltage of the series circuit for the BBU 500 allows the battery cells 502 to operate at a long period of time before discharging to the voltage V. Because the voltage of the cells is added together, each of the cells can drop to below the voltage V, but the combined voltage of the circuit would still exceed the voltage V. However, as stated above, the current provided by the BBU 500 is limited to the lowest current output of the four battery cells 502, and thus the BBU typically cannot power a large number of datacenter components 103.

Figure 7:
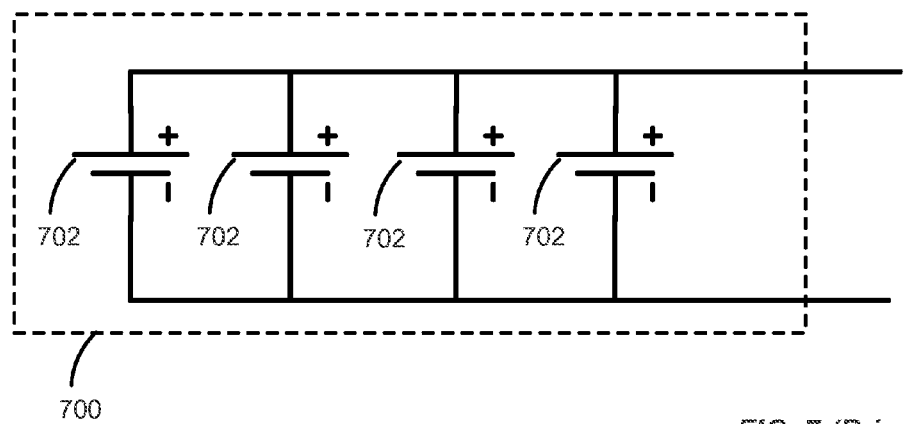
FIG. 7 is circuit diagram of a prior art backup battery unit including four battery cells wired in parallel.

FIG. 7 shows a prior art BBU 700 that is wired in parallel. The BBU 700 includes four battery cells 702 in a parallel circuit. Again, like the BBU 500, the BBU 700 could have more or less than four battery cells 702, but four are shown as an example. For ease of reference, such a configuration is referred to as "4P" herein, representing four (4) cells wired in parallel (P).

In a parallel battery circuit such as is used in the BBU 700, the voltage across each of the battery cells 702 is the same, and the total current is the sum of the currents for each of the components. Thus, the circuit for the BBU 700 can provide higher current than a series circuit with the same battery cells; but the voltage is limited to an average of the voltage among the four battery cells. This configuration allows a large number of devices to be powered by the BBU 700, but at a limited voltage.

Figure 8:
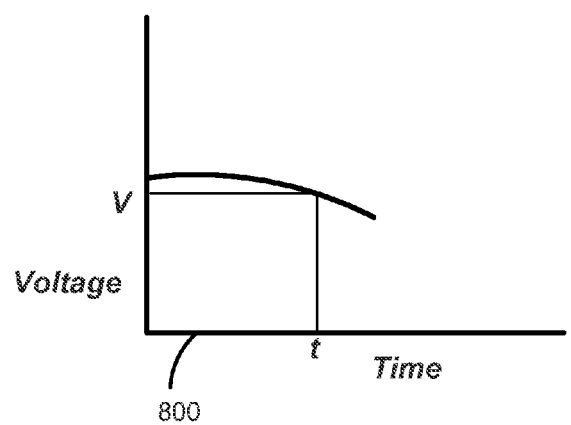
FIG. 8 is graph representing a discharge cycle of the backup battery unit of FIG. 7.

FIG. 8 is a graph 800 showing voltage drop over time for a prior art BBU having a parallel circuit, such as the BBU 700. As can be seen, the voltage for the system starts at a lower voltage, but eventually tapers off at time t. In theory, if the load is the same on the BBU 700 as on the BBU 500 and the cells 502 and 702 are the same, then t is the same for the graphs 600 and 800. However, because the DC to DC conversion can be more efficient for the BBU 700, the efficiency of conversion can cause the time t to be longer for the parallel circuit BBU 700. Moreover, the BBU 700 can provide more current and thus power more devices than the BBU 500, albeit at a higher discharge rate with more loads.

Figure 9:
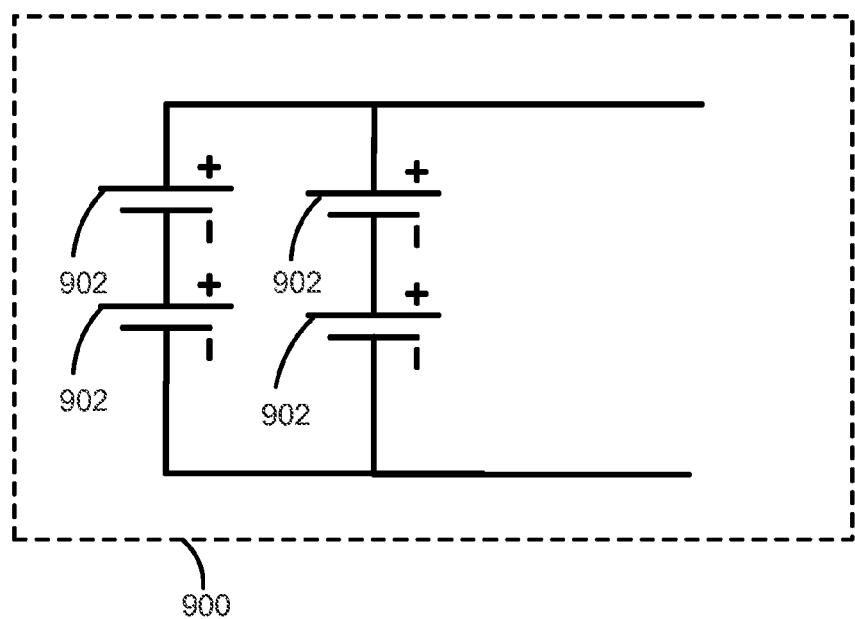
FIG. 9 is circuit diagram of a prior art backup battery unit including four battery cells wired with two sets of two cells wired in series, and the two sets wired in parallel.

Prior art BBUs are not limited to only series or only parallel circuits. In general, such BBUs can be configured to provide the desired voltage and current for the BBU. In an example shown in FIG. 9, the circuit includes two sets of two battery cells 902 wired in series, with the two sets then wired in parallel. For ease of reference, such a configuration is referred to as "2S 2P" herein. Assuming all cells 502, 702, 902 are the same, the 2S 2P BBU 900 can provide more voltage than the 4P BBU 700 but less than the 4S BBU 500, and more current than the 4S BBU 500, but less than the 4P BBU 700. As can be understood, a configuration can be selected that best serves a particular installation. However, prior art BBUs are typically hardwired into a particular configuration, so if a different configuration is needed, a different BBU would need to be installed.

Figure 10:
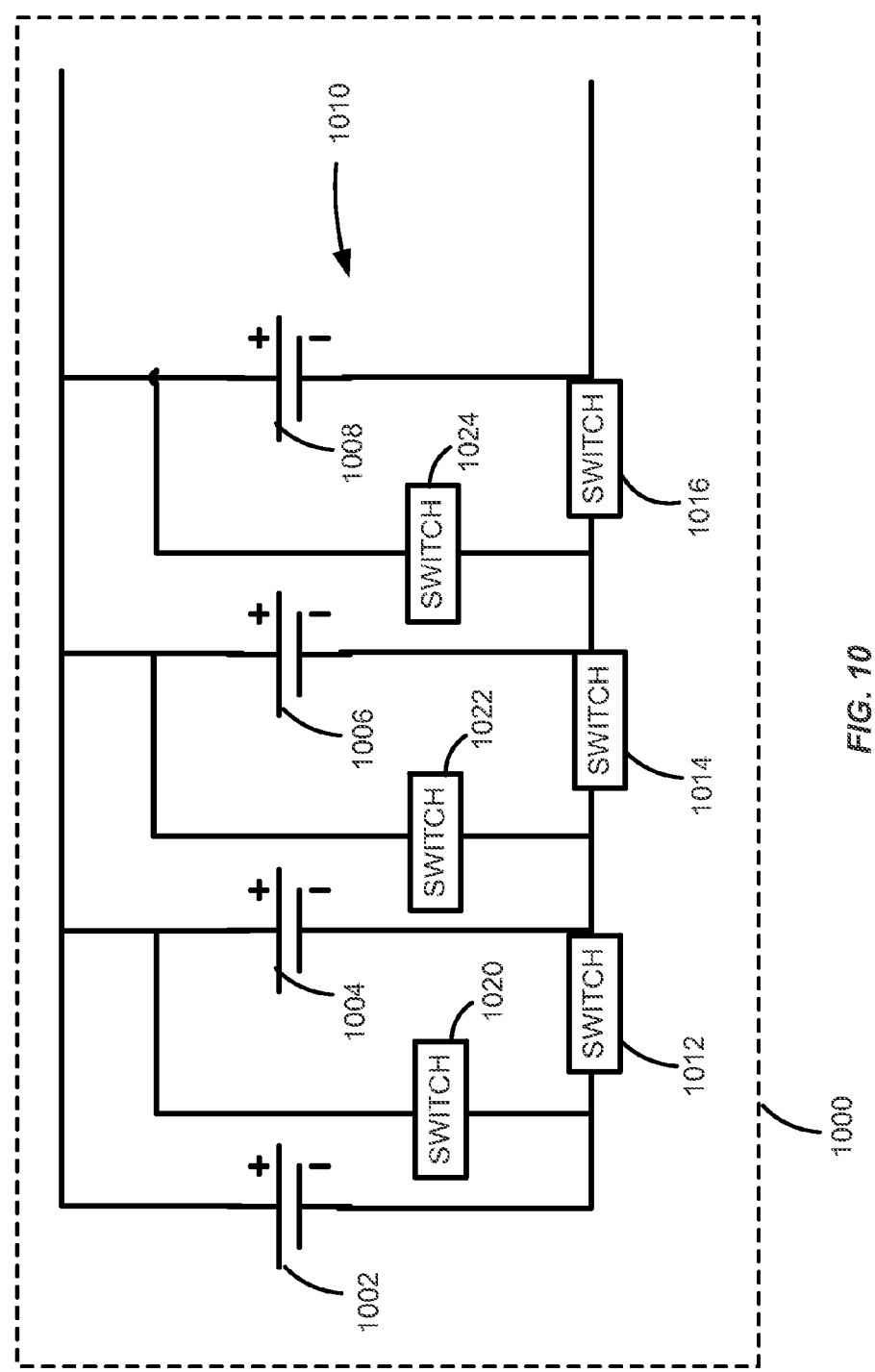
FIG. 10 shows a configurable backup battery unit in accordance with embodiments.

FIG. 10 shows a configurable BBU 1000 in accordance with embodiments. The BBU 1000 includes four battery cells 1002, 1004, 1006, 1008 that are wired together in a circuit 1010. In accordance with embodiments, the circuit 1010 is configurable so that the battery cells 1002-1008 can be wired in series or parallel or a combination of these. To this end, the circuit 1010 includes switches 1012, 1014, 1016 that are connected between negative terminals of adjacent battery cells 1002-1008. In addition, the circuit 1010 includes switches 1020, 1022, 1024 that are positioned on the circuit between the positive terminal of one of the battery cells and an adjacent negative terminal of one of the battery cells.

Although depicted as "switches" throughout the drawings, any device that provides the functions herein can be used. As examples, the "switches" can be physical devices that are manually operable for the functions described herein, or can be a printed circuit board and associated components for providing the functions. Any switch mechanism that can provide the functions of the switches can be used.

The switches 1012-1016 and 1020-1024 can be closed or open to provide a variety of different circuits for the BBU 1000. As an example, if the switches 1020, 1022, 1024 are closed while the switches 1012, 1014, 1016 are open, then the BBU is wired so that the batteries 1002-1008 are in series (i.e., as 4S).

If the switches 1012, 1014, 1016 are closed and the switches 1020, 1022 and 1024 are open, then the BBU 1000 is wired in parallel (i.e., as 4P). Additional switching options can be provided to provide 2S 2P or other configurations.

In embodiments, the management component 101 can operate the switches 1012-1024, for example by instructing a printed circuit board on the circuit 1010. Alternatively, the BBU 1000 can include its own management component for changing the BBU configuration. In still further embodiments, the management component 101 or a another management module can provide information about a need or desire to change the configuration of the BBU 1000, and a technician can switch the switches in response to the instructions, for example manually. Operational changes can be dictated by a playbook for a technician, or can be limited to a finite number of options, such as a single, external switch on the BBU 1000 that switches configuration from 4S to 4P. Protection circuitry can be provided to avoid changing operation at the wrong time or to an unsafe configuration.

Having the BBU 1000 reconfigurable between different configurations provides a number of different benefits. For example, a BBU that is typically operated under load in series (4S) can be switched to parallel (4P) for charging. By charging this in this configuration, the battery cells 1002-1008 can be charged to a common voltage. When the BBU 1000 is needed to power a load, the switches can be operated to change the BBU to a 4S configuration.

Figure 11:
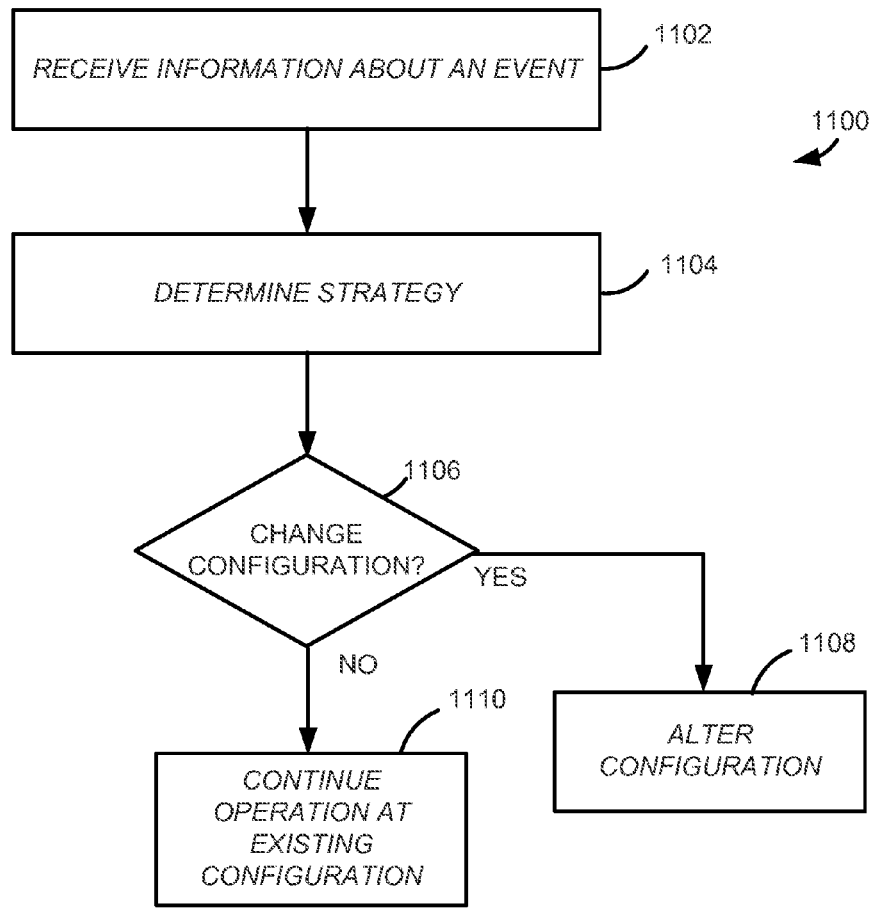
FIG. 11 is a flowchart showing a process for changing the configuration of the backup battery unit of FIG. 10 in accordance with embodiments.

FIG. 11 is a flowchart showing a process 1100 for changing the configuration of a BBU in accordance with embodiments. In one example, where the configuration is changed between charging and load situations, the process starts with the BBU 1000 being in a charge state, configured for example in 4P. Beginning at 1102, information is received, for example by the management component 101, about an event. In this example, the event can represent a need for backup power from the BBU. The event can be that power from the BBU is needed for powering one or more datacenter components 103 as a result of power loss in a room 102.

At 1104, a strategy is determined for the event. The strategy is information about how to handle the BBU 1000 responsive to the event. The strategies discussed herein are typically available prior to an event, and can be input by a user at the client device 109, can be provided as a package to installers of datacenters, or can otherwise be available as a plan for action in the case of an event. The strategies can be maintained in a playbook, or can be stored in the data store 107 for access during an event.

If the BBU is to be reconfigured, then 1106 branches to 1108, where the management component 101 provides information about changing the configuration, for example from 4P (for charging) to 4S (for backup power). As described above, this change of configuration can be made automatically by the management component by operating the proper switches, and/or can be made by providing instructions to a technician or other intermediary, who in turn would make the change. An example would be to change operation from 4P to 4S or 2S 2P. If no change is to be made, then 1106 branches to 1110, where the BBU 1000 continues in the same configuration.

As another example, a situation may exist where high voltage is needed and low current is tolerable, and thus the circuit 1010 can be shifted to series operation (4S). Alternatively, if a high current situation is needed, then the BBU 1000 can be remain in or be switched to parallel operation (4P).

As another example, the BBU 1000 can be reconfigured during discharge so as to operate more efficiently. As described above, a BBU can perform a DC to DC conversion more efficiently when producing voltage at or near the converted-to voltage. In such an embodiment, the BBU could begin operation in 4P (lower voltage), and then reconfigure to a higher voltage configuration (2S 2P or 4S) as the voltage of the BBU drops too low for conversion. In such a process, there can be multiple stages from start to full discharge of the BBU 1000, such as 4P to 2S 2P, and then from 2S 2P to 4S. Adjustments may have to be made for the lower current state, and some adjustments are suggested below. In such an embodiment where there are multiple changes of configurations of the BBU 1000, the process 1100 would be repeated, with the additional event being a measured lower voltage of the BBU 1000. Thus, in embodiments, the management component 101 continues to monitor conditions and can change the configuration of the BBU 1000 as the result of new events triggered by new conditions in the datacenter 100.

As can be understood, when switching occurs between 4P and 4S, the input voltage to a DC to DC converter changes dramatically. To address the large variation in input voltages, a special DC to DC converter can be used, such as is described in "A Two-Stage Approach to Highly Efficient, Super-Wide Input Voltage Range DC-DC Converters" (Schlecht, SynQor Advancing the Power Curve, 2009) or "60V/3 A Step-Down DC/DC Converter Maintains High Efficiency over a Wide Range of Input Voltages," (Marosek, Design Features, Linear Technology Magazine, August 2002), both of which are incorporated herein by reference.

In case of an event, a reconfiguration can be helpful, for example, to provide long term power for a particular datacenter component 103 at the expense of power to other datacenter components. In an example, an event may occur where it is desired to provide long term power to a particular datacenter component based upon its criticality, even if it requires removing power from or reducing power to other datacenter components typically powered by the BBU. Such an alteration can be made, for example, as a 4P configuration starts to drop voltage below a conversion level. In such an event, the BBU 1000 can be switched from parallel (4P) from series (4S) configuration, and power from the BBU 1000 can be preferentially directed to or used by a subset of datacenter components that normally receive power from the BBU. The voltage would then be sufficient for conversion, but the current would only be sufficient to power the subset of the datacenter components 103.

Figure 12:
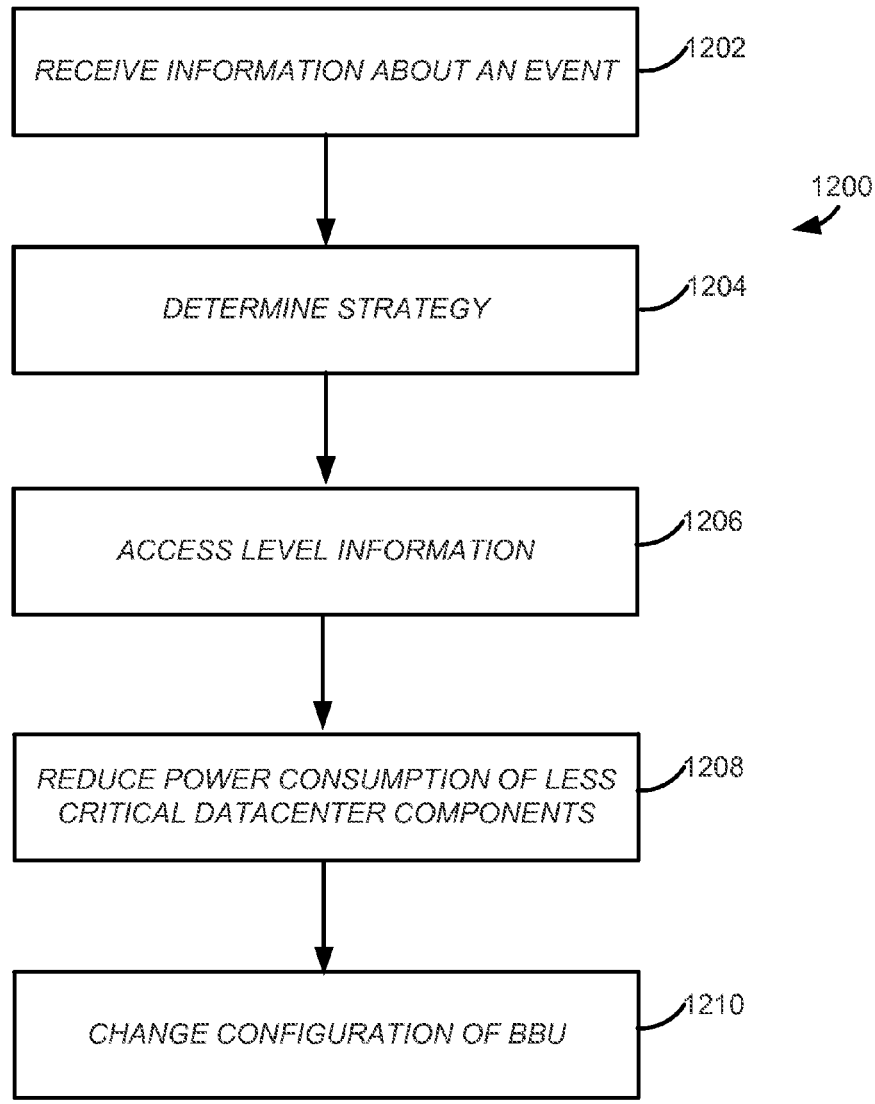
FIG. 12 is a flowchart showing a process for altering the configuration of a backup battery unit to provide power to a subset of more critical datacenter components in accordance with embodiments.

FIG. 12 is a flowchart showing a process 1200 for altering the configuration of a BBU, such as the BBU 1000, to provide power to a subset of more critical datacenter components in accordance with embodiments. The process starts with a power outage or other situation in the datacenter where the BBU 1000 is needed for backup power. The BBU may or may not already be providing power to some datacenter components 103.

Beginning at 1202, information is received about an event, for example by the management component 101. The event can be that the BBU 1000 is needed for powering one or more datacenter components 103 as a result of power loss in a room 102 or a rack 120. Typically, for the example shown in FIG. 12, the event will include information that indicates that it is more desirable for the BBU 1000 to provide power to some datacenter components instead of all datacenter components to which the BBU 1000 typically provides backup power, for example in a situation where the BBU 1000 will be used for long term backup.

At 1204, a strategy is determined for the event. The strategy is information about how to handle the BBU 1000 responsive to the event. The strategies are typically available prior to an event, and can be input by a user at the client device 109, can be provided as a package to installers of datacenters, or can otherwise be available as a plan for action in the case of an event. The strategies can be maintained in a playbook, or can be stored in the data store 107 for access during an event.

At 1206, the layer information about the effected datacenter components 103 is accessed. This layer information can be stored, for example, in the data store 107. As discussed above, the layer information is generally information about the layers to which each of the datacenter components 103 is assigned, and can be based upon the criticality of the datacenter components 103.

At 1208, the less critical layers of datacenter components are powered down or are put into a lower power state. In some embodiments, this might involve configuring or adjusting the processor performance state (P-state), processor operating state (C-state), processor sleep state (S-state), device power state (D-state), global system state (G-state) or similar power management feature where putting the system in a "higher state" (e.g., P3) typically consumes less power than at a "lower state" (e.g., P1). In other embodiments, the non-critical datacenter components can turned off. In either event, the load that has to be powered by the BBU 1000 is reduced, allowing the BBU 1000 to operate at lower current.

At 1210, the configuration of the BBU 1000 is changed, for example from 4P to 4S or from 4P to 2S 2P. Changing the BBU 1000 configuration permits the BBU to operate in a different mode, for example with higher voltage in 4S, allowing longer discharge, albeit with less current. As such, in this example, the load that can be powered by the BBU 1000 is reduced.

Because the load has been reduced at 1208, the BBU can be changed to a low current/high voltage state (e.g., 4S) and can thus provide backup power for a longer period of time. Since the more critical layers are kept active, the combined process permits longer backup for the critical layers.

Figure 13:
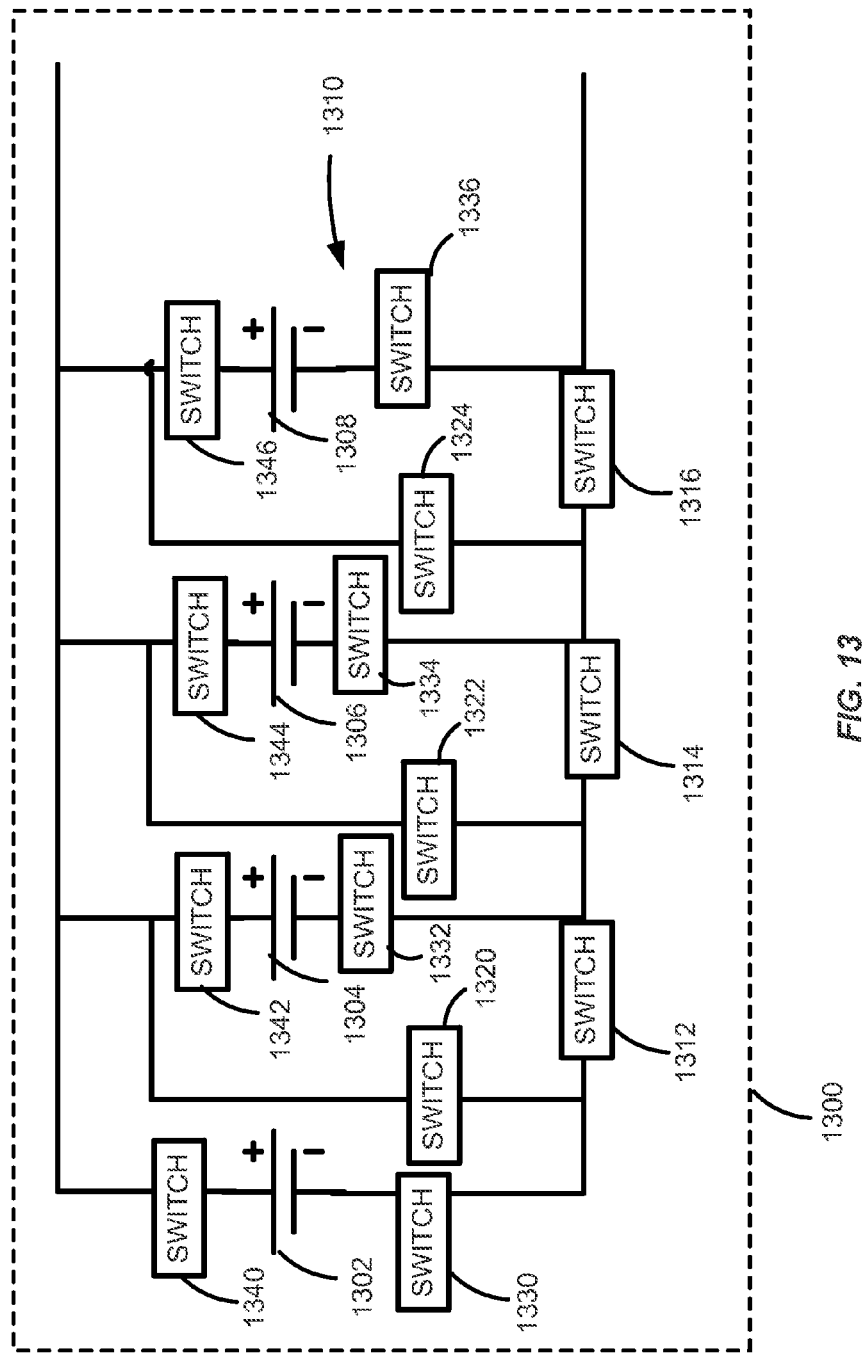
FIG. 13 shows an alternate embodiment of a backup battery unit that permits access to and/or repair of battery cells during operation of the backup battery unit in accordance with embodiments.

FIG. 13 shows an alternate embodiment of a BBU 1300 that permits access to and/or repair of battery cells during operation of the BBU. The reference numerals used in FIG. 13 represent like parts to those in FIG. 10, with the like parts beginning with the numeral "13" in FIG. 13 and the numeral "10" in FIG. 10. In addition to the switches that are shown in FIG. 10, FIG. 13 includes additional switches 1330, 1332, 1334, 1336 that are connected between the load and the negative terminal of each of the battery cells 1302, 1304, 1306, 1308. In addition, switches 1340, 1342, 1344 and 1346 are connected between the positive terminal and the load.

Each of the switches 1330-1346 is normally closed during operation of the BBU 1300. In embodiments, the datacenter management component 101 can instruct operation of the appropriate switches to disconnect one or more battery cells 1302-1308 from the circuit 1310. For example, the switches 1330 and 1340 can be opened to disconnect the battery cell 1302 from the circuit 1310. In this configuration, the other battery cells 1304-1308 can continue to provide power to the circuit 1310. As described above, these battery cells 1304, 1306, 1308 can operate in series or in a parallel, and can be reconfigured to address the fact that the cell 1302 is no longer in service. When the battery cell 1302 is disconnected, it can be repaired, tested, or replaced with another battery cell.

Figure 14:
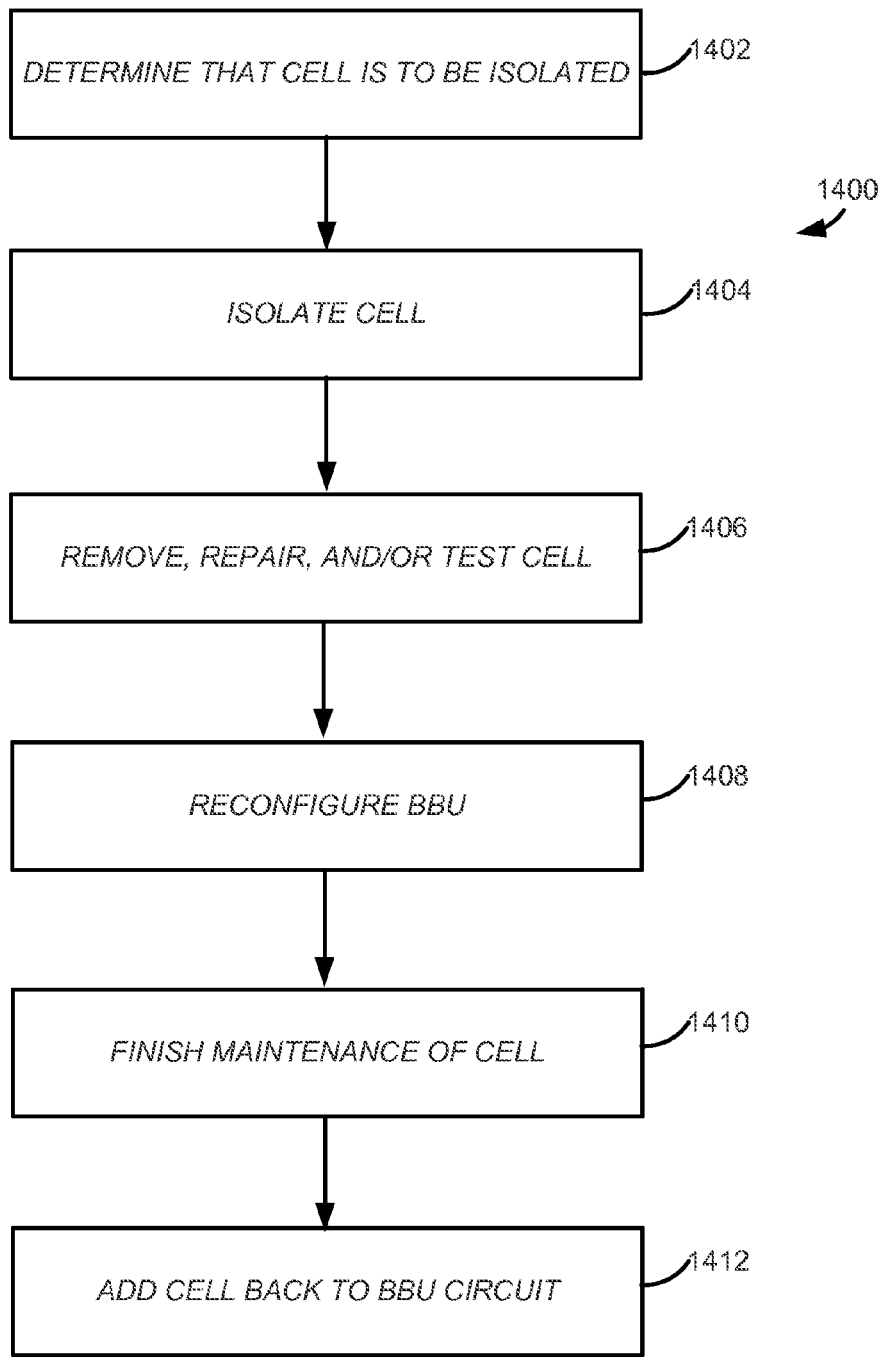
FIG. 14 is a flowchart showing a process for utilizing the circuit of FIG. 13 in accordance with embodiments.

FIG. 14 is a flowchart showing a process 1400 utilizing the circuit 1310 of FIG. 13 in accordance with embodiments. Beginning at 1402, a determination is made that a cell is to be isolated, for example via information sent from one of the sensors 105 to the management component 101 that the cell is not functioning correctly. Alternatively, a cell may need to be replaced or repaired in accordance with the maintenance schedule, or may be accessed for another reason, such as to run a test. Thus, 1402 can result in accordance with a schedule, and does not necessarily involve a failure event in the datacenter 100.

At 1404, the battery cell, e.g., cell 1302, is isolated, for example, by opening the switches on opposite sides of the battery cell. The management component 101 can isolate the cell by instructing the switches to open, or can provide information for a technician to do so. At 1406, the isolated cell 1302 is removed, repaired, or tested. If desired, at 1408, the BBU 1300 can be reconfigured, for example, into a series or parallel circuit, as described above. Reconfiguring the BBU 1300 can permit sufficient voltage and/or current to be supplied to the load, despite the fact that a cell has been removed from the circuit 1310. If desired, 1408 can occur before 1406, can occur both before and after 1406, or can occur after 1406. At 1410, the isolated cell is replaced with a new cell, the test is completed, the repair is completed, or the cell 1302 otherwise ready to be added back to the circuit 1310. At 1412, the cell 1302 is added back to the BBU circuit 1310, for example, by closing the switches 1330, 1340. If desired, the BBU 1300 can be reconfigured back to its initial configuration or a new configuration.

The circuit 1310 provides isolation and action on an individual cell while the BBU 1300 is in operation. The BBU 1300 can be charging or can be under load. In embodiments, cells can be routinely isolated and tested, and replaced or repaired as necessary. In addition, cells that indicate failure can be replaced without having to remove a BBU from connection with the power system 106 of the datacenter 100.

Figure 15:
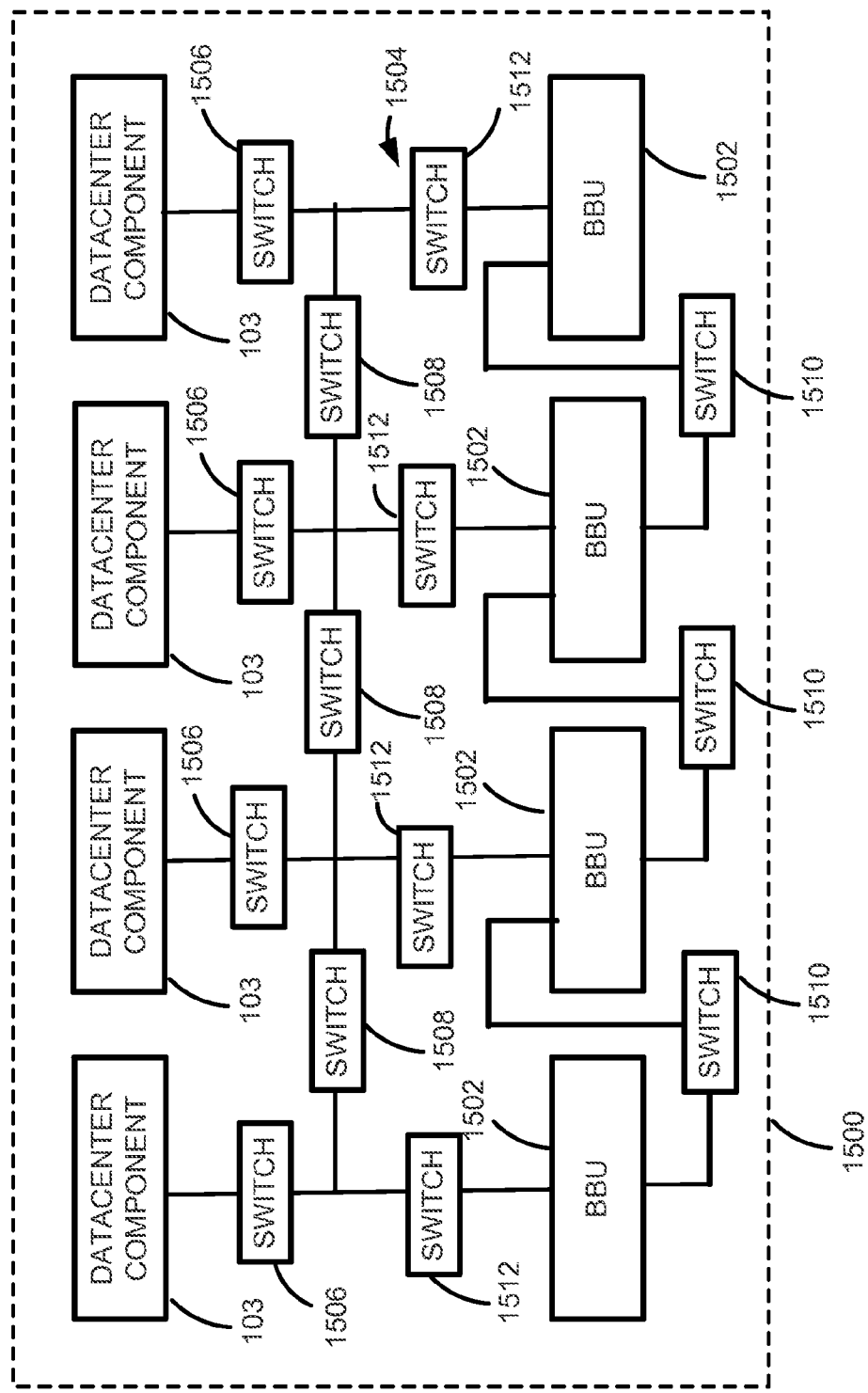
FIG. 15 is a block diagram representing a system for preferentially providing battery resources to datacenter components in accordance with embodiments.

FIG. 15 shows a system 1500 for preferentially providing battery resources to datacenter components 103 in accordance with embodiments. In general, one or more BBUs 1502 are connected to one or more datacenter components 103 via a bus 1504. The bus 1504 is configurable so that the BBUs 1502 can preferentially provide battery power to selected datacenter components 103, for example, based upon the layer of the datacenter components and the occurrence of an event. To this end, switches 1506 can be provided for each datacenter component between the datacenter component and the bus 1504. The switches 1506 are normally closed, and are connected to the bus 1504.

A second set of switches 1508 are connected between sets of datacenter components 103 and BBUs 102. In one embodiment, the switches are normally open, so that the bus 1504 can directly connect the datacenter components 103 to one BBU 1502 during normal operation.

The bus 1504 may be used to selectively provide power to one or more of the datacenter components 103 connected to the bus. As an example, in a power failure situation where batteries are used for long time, each of the switches 1508 can be closed, and all but one of the switches 1506 can be opened. In this configuration, only one of the datacenter components 103 would receive power from all of the BBUs. In this particular configuration, the BBUs would be providing power in parallel to the one datacenter component 103.

Switches 1510 can also be provided between positive and negative terminals of adjacent BBUs, and additional switches 1512 can be provided between the positive terminals of the BBUs and the bus 1504. In such a configuration, the BBUs 1502 can be configured so as to provide power in series to one or more of the datacenter components 103 by closing the switches 1510 and opening the switches 1512. For example, the switches 1512 can be opened, with the switches 1510 closed, and the switches 1506 for datacenter components 103 that are to be provided power can be closed.

The system 1500 provides multiple options for prolonging power supply by BBUs 1502 to more critical datacenter components in the case of an event. These situations are described above with respect to individually reconfigurable BBUs, and are not repeated in detail here. Thus, the processes 300, 1100, 1200, and 1400 can be altered to reconfigure the bus 1502 to address events in the datacenter 100. In general, the bus 1504 can be utilized to selectively power a subset of the datacenter components 103, individually provide power from one or more BBUs to one or more datacenter components 103 (e.g., based upon criticality), and wire two or more of the BBUs to the bus in parallel or in series (e.g., to provide preferred voltage and/or current). In addition, one or more of the BBUs can be removed for maintenance, testing, or replacement and in the case of the need for battery backup, the other BBUs can provide backup, reconfigured or not, to power to the bus 1502 and the datacenter components 103.

Figure 16:
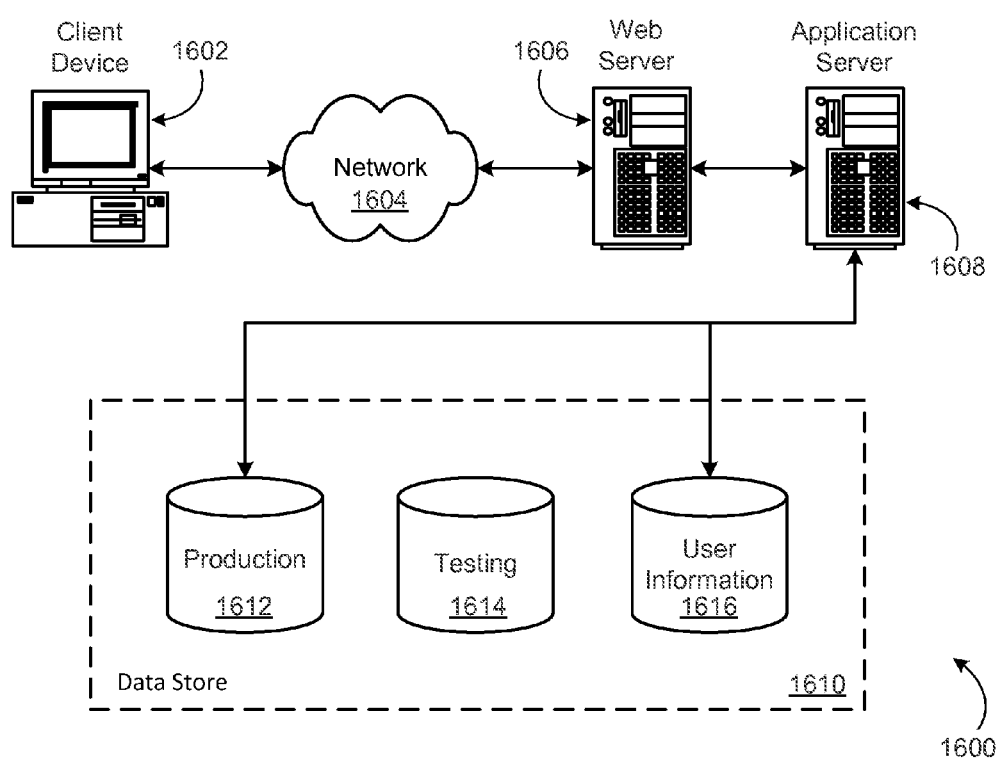
FIG. 16 illustrates an environment in which various embodiments can be implemented.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1602 and the application server 808, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-layer applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing an array of backup battery units, the array of backup battery units comprising a plurality of battery backup units connected to a common bus, the method comprising:
    under the control of one or more computer systems configured with executable instructions,
    determining at least one component included in at least one load powered by the array of backup battery units, wherein the at least one component comprises network hardware devices;
    receiving, directly from each component included in the at least one load, operational characteristics of the component that include an indication of power consumption requirements based on a current processing load for that component;
    calculating, based on the received operational characteristics, a level of current necessary to maintain each component included in the at least one load;
    calculating, based on the level of current necessary to maintain each component included in the at least one load, a level of current necessary to maintain the at least one load;
    determining a voltage level that will result in the level of current necessary to maintain the at least one load being generated, the level of current being generated by supplying power from the array of backup battery units to a DC to DC converter at the voltage level;
    receiving information about an event relative to the array of backup battery units, the event resulting in a voltage of the array of backup battery units falling below the voltage level;
    in response to receiving the information, determining a second combination of parallel or series to which the array of backup battery units is to change configuration based at least in part on a first combination of parallel or series in which the array of backup battery units is currently configured;
    when the second combination of parallel or series is available to return the voltage of the backup battery unit above the voltage level, instructing the array of backup battery units to change configuration from being wired in the first combination of parallel or series to being wired in the second combination of parallel or series;
    when the second combination of parallel or series is unavailable, causing one or more components of the load to be removed from the load based on a criticality of the one or more components, the criticality of each of the one or more components determined automatically based on the operational characteristics of the component; and
    instructing the array of backup battery units to provide backup power to the at least one load while being wired in the second combination.

2. The computer-implemented method of claim 1, further comprising, in response to receiving information that the voltage of the array of battery backup units has dropped below the voltage level again, further instructing the array of backup battery units to switch configuration from the battery backup units being at least partly wired in one of parallel or series to being fully wired in series.

3. The computer-implemented method of claim 1, wherein the first combination of parallel or series is the array of backup battery units being fully wired in parallel.

4. The computer-implemented method of claim 1, further comprising, in response to receiving information about a load reduction on the array of battery backup units, providing instructions for changing the configuration of the array of backup battery units from an at least partly parallel circuit where at least some of the battery backup units of the array of backup battery units are wired in parallel to a series circuit where battery cells of the battery backup units of the array of backup battery units are wired in series.

5. The computer-implemented method of claim 1, further comprising, instructing the array of backup battery units to switch configuration so that one of said plurality of battery backup units is removed from the array of backup battery units.

6. The computer-implemented method of claim 1, wherein instructing the array of backup battery units to change configuration comprises causing switches on a bus of the array of backup battery units to actuate to change the configuration.

7. The computer-implemented method of claim 1, further comprising in response to determining there is no configuration to which the array of backup battery units can be changed to return the voltage of the array of backup battery units above the voltage level, providing instructions to a subset of the at least one component to enter a low-power state.

8. An array of battery backup units, comprising:
a plurality of battery backup units;
a bus connecting the battery backup units;
a switch mechanism for the bus, actuation of the switch mechanism causing the circuit to change a number of the battery backup units from being wired in parallel to being wired in series, the switch mechanism for the bus being actuated in response to detecting a decrease in a voltage level produced by the plurality of battery backup units, and the number of the battery backup units changed from being wired in parallel to being wired in series being determined to restore the voltage level to a threshold voltage level, the threshold voltage level determined to be sufficient to generate an amount of current required to power a particular load comprising network datacenter components based on a composition of the particular load and based on operational characteristics received from each network datacenter component in the particular load, the operational characteristics including an indication of current power usage for that network datacenter component, wherein upon determining that the number of the battery backup units needed to restore the voltage level to the threshold voltage level is more than a total number of battery backup units available, providing instructions to the particular load to cause the composition of the particular load to be altered based on a criticality level of components of the particular load, the criticality level of components of the particular load determined automatically based on the operational characteristics; and
a DC to DC converter configured to receive power from the battery backup units at the threshold voltage level and supply the amount of current required to power the particular load.

9. The array of battery backup units of claim 8, wherein actuation of the switch mechanism causes all battery backup units in the array of battery backup units to change from being wired in parallel to being wired in series.

10. The array of battery backup units of claim 8, wherein different actuation of the switch mechanism causes said plurality of battery backup units to change from being wired in series to being wired in parallel.

11. The array of battery backup units of claim 8, wherein different actuation of the switch mechanism causes all battery backup units in the array to change from being wired in series to being wired in parallel while the array of battery backup units is charging.

12. The array of battery backup units of claim 8, wherein different actuation of the switch mechanism causes said plurality of battery backup units in the array of battery backup units to change to being wired partly in series and partly in parallel.

13. The array of battery backup units of claim 8, wherein the particular load comprises a plurality of network datacenter components connected to the bus for being powered by the bus, each of the plurality of the datacenter components being selectively connectable to the bus.

14. A computer-implemented method for managing an array of backup battery units, the array of backup battery units comprising a plurality of battery backup units connected by a bus, the method comprising:
under the control of one or more computer systems configured with executable instructions,
receiving information about a battery backup unit in the array of battery backup units that indicates the battery backup unit requires repairs, the array of battery backup units being in a first configuration;
instructing the array of backup battery units to disconnect the battery backup unit from the bus;
receiving, from each component in at least one load, operational characteristics related to current power usage requirements of the component;
determining a target voltage level needed to maintain the at least one load based at least in part on a composition of the at least one load and the received operational characteristics related to current power usage requirements of each component in the at least one load, wherein the power is supplied to the at least one load by a DC to DC converter upon the DC to DC converter being supplied power by the array of backup battery units at the target voltage level;
determining whether a second configuration is available for the array of backup battery units that causes the array of battery backup units to produce the target voltage level absent the battery backup unit;
when the second configuration is available, instructing the array of backup battery units to change from the first configuration to the determined second configuration; and
when the second configuration is unavailable, instructing an operator of the at least one load to reduce the components in the at least one load.

15. The computer-implemented method of claim 14, further comprising, instructing the array of backup battery units to change from the first configuration to the determined second configuration prior to instructing the array of backup battery units to disconnect the battery backup unit from the bus.

16. The computer-implemented method of claim 15, further comprising, instructing the array of backup battery units to change from the determined second configuration to the first configuration after determining that the disconnected battery backup unit has been replaced.

17. The computer-implemented method of claim 14, further comprising, instructing the array of backup battery units to change from the first configuration to the determined second configuration after instructing the array of backup battery units to disconnect the battery backup unit from the bus.

18. The computer-implemented method of claim 14, wherein the information about the battery backup unit in the array comprises information that the battery backup unit is not operating in accordance with a requirement.

19. The computer-implemented method of claim 14, wherein the information about the battery backup unit in the array comprises information that at least one of maintenance or testing is due for the battery backup unit.

20. An array of battery backup units, comprising:
a plurality of battery backup units;
a bus connecting the battery backup units;
a switch mechanism for the bus, actuation of the switch mechanism causing at least one of the plurality of the battery backup units to be switched from a first configuration of series or parallel and producing a first voltage level, to a second configuration of series or parallel, the second configuration of series or parallel being configured to produce a second voltage level when at least one battery backup unit is removed from the bus, wherein the second voltage level is determined to be sufficient to generate an amount of current to power a particular load comprising a plurality of datacenter components based at least in part on a composition of the particular load and based on operational characteristics received from each datacenter component in the particular load, the operational characteristics including an indication of current power usage for that datacenter component, wherein upon determining that the plurality of the battery backup units needed to be switched to produce the voltage level is more than a total number of the battery backup units available, providing instructions to the load to cause the composition of the load to be altered based on a criticality level of components of the load, the criticality level of components of the particular load determined automatically based on the operational characteristics; and a DC to DC converter configured to receive power from the battery backup units at the second voltage level and supply the amount of current required to power the particular load.

21. The array of battery backup units of claim 20, further comprising a second switch mechanism for the circuit, actuation of the second switch mechanism causing the circuit to change from the battery backup units being wired in one of parallel or series to being wired in the other of parallel or series.

22. The array of battery backup units of claim 21, wherein actuation of the second switch mechanism causes the circuit to change from the plurality of battery backup units being wired in series to being wired in parallel.

23. The array of battery backup units of claim 21, wherein actuation of the second switch mechanism causes the circuit to change from the plurality of battery backup units being wired in parallel to being wired in series.

24. The array of battery backup units of claim 21, wherein different actuation of the second switch mechanism causes said plurality of battery backup units in the battery backup unit to change to being wired partly in series and partly in parallel.

25. The array of battery backup units of claim 20, wherein the load comprises a plurality of datacenter components connected to the bus for being powered by the bus, each of the plurality of the datacenter components being selectively connectable to the bus.

* * * * *